May 4, 1965   J. SCHEROTTO   3,181,260
COLLAPSIBLE CARDBOARD DISPLAY DEVICE
Filed June 21, 1962   2 Sheets-Sheet 1
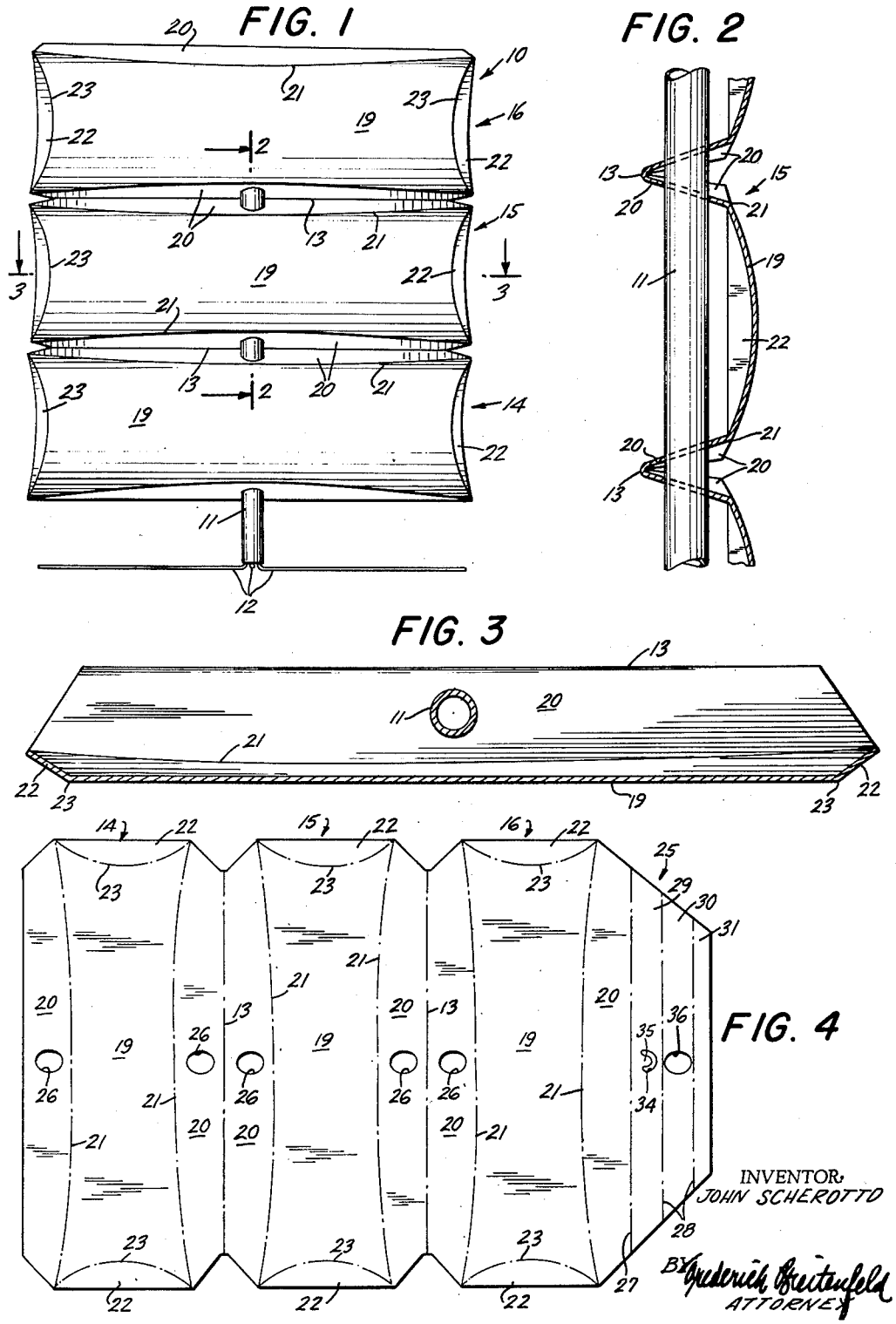
INVENTOR,
JOHN SCHEROTTO
BY
ATTORNEY May 4, 1965

J. SCHEROTTO 3,181,260

COLLAPSIBLE CARDBOARD DISPLAY DEVICE

Filed June 21, 1962

INVENTOR:
JOHN SCHEROTTO

BY Frederick Breitenfeld

ATTORNEY

United States Patent Office 3,181,260
Patented May 4, 1965

3,181,260
COLLAPSIBLE CARDBOARD DISPLAY DEVICE
John Scherotto, Secaucus, N.J., assignor, by mesne assignments, to Einson Freeman and De Troy Corporation, a corporation of New Jersey
Filed June 21, 1962, Ser. No. 204,286
7 Claims. (Cl. 40—124.1)

This invention relates to display devices and more particularly to a device composed of a sheet of foldable cardboard or equivalent material.

It is a general object of the invention to provide an attention-arresting display which is inexpensive to manufacture and, although formed of flexible and foldable sheet stock, is stiff and sturdy and assumes a three-dimensional appearance.

It is another object of the invention to provide a display which may be folded into a flat compact condition for purposes of shipping and storage and which may be set up in display condition quickly and easily and without the exercise of special skill.

It is a further object of the invention to provide a display device admirably adapted to use as a pole display, i.e., wherein the cardboard sheet is supported by a straight upstanding pole.

It is an important object of the invention to provide a display device which, except for a simple support such as a pole, consists entirely of a single sheet scored and folded in a special and unique manner.

Specifically, the invention is characterized by the provision, on an initially flat cardboard sheet or equivalent, of a pair of arcuate score lines which are the mirror image of each other and which separate a central display region of the sheet from two marginal regions. When the display is set up by bending the marginal regions along the score lines out of the plane of the central region, the central region is quite remarkably and unexpectedly distorted into a non-planer condition and is thereby stiffened. In addition, by virtue of the bent marginal regions and the distortion of the central region the display takes on an unusual and eye-catching three-dimensional appearance.

Any particular display may consist of a single panel including a central display region and its associated marginal regions, or more than one such panel arranged one above another or side-by-side with the free edges of their marginal regions joined along hinge lines.

Additional objects and advantages of the invention will be apparent from the following description which is to be read in conjunction with the accompanying drawings.

In the drawings:

FIG. 1 is a front elevational view of an illustrative display device constructed in accordance with this invention;

FIG. 2 is a vertical cross-sectional view taken on line 2—2 of FIG. 1;

FIG. 3 is a horizontal cross-sectional view taken on line 3—3 of FIG. 1;

FIG. 4 is a face view of the sheet stock before being folded to form the display of FIG. 1;

Figure 5:
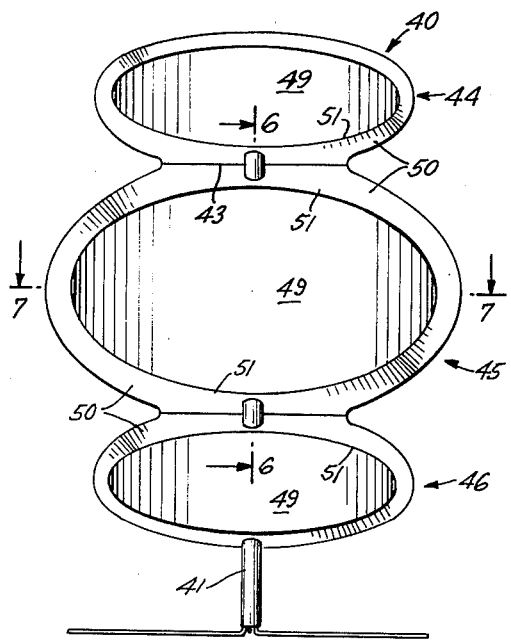
FIG. 5 is a front elevational view of another embodiment of the present invention.

The illustrative embodiment of the invention shown in FIGS. 1-4 comprises generally a display element 10 and a support element 11, the latter in the present example being a straight upstanding pole. The pole 11 may be maintained in upright position by any suitable means. In the present example, two wire elements each bent to form an inverted U-shaped central portion and outwardly projecting leg portions 12 are employed, the U-shaped portions being pressed frictionally into the lower end of the hollow pole 11 in such a way that the pair of legs 12 of each element are at right angles to the pair of legs of the other element.

The display element is an initially flat cardboard sheet or the equivalent (see FIG. 4) which may readily be printed with any desired advertising or other display material. In addition, in its flat condition it may readily be scored along the lines hereinafter referred to as score lines.

In the present example, the cardboard sheet is divided into three panels 14, 15 and 16, by two transverse hinge lines 13. Obviously, the entire sheet could be used to form one panel or it may be divided into any desired number of panels. Each panel comprises a central display region 19 and two marginal regions 20 on opposite sides of the central region. The marginal regions 20 of each panel are separated from the central region 19 by two arcuate score lines 21 which are the mirror image of each other. In the present illustration the score lines 21 of each panel are both convex with respect to the central region 19. The edge of each marginal region 20 of the center panel 15 opposite the score line 21 is joined to the corresponding edge of the closer marginal region 20 of each of the adjacent panels 14 and 16 along one of the hinge lines 13. At the two remaining opposite sides of the central region 19 of each panel are two additional marginal regions 22 separated from the central region 19 by two arcuate score lines 23, the latter score lines being convex with respect to the central region 19.

Each of the marginal regions 20, except the outermost one of the panel 16, is provided with a hole 26 capable of accommodating the pole 11, all of the holes being in alignment. In addition, means are provided for securing the display element to the upper end of the pole 11. The securement means may be of any desired type, but preferably is formed as an integral extension 25 of the display element, joined to the outermost marginal region 20 of the panel 16 along a hinge line 27. The extension is provided with two transverse score lines 28 dividing it into three narrow strips 29, 30 and 31. The innermost strip 29 is provided with an arcuate slot 34 which produces a tongue 35, and the middle strip is provided with a hole 36 identical to the holes 26, the slot 34 and hole 36 being in alignment with the holes 26.

If the face of the display element viewed in FIGS. 1 and 4 is considered the front face, the display device is set up by first bending the marginal regions 20 rearwardly along their respective score lines 21 and forwardly along the hinge lines 13 (see FIG. 2). Due to the curvature of the score lines 21, the bending back of the marginal regions 20 causes the central display regions 19 to assume a forwardly convex contour as viewed in FIG. 2. The display regions and the display element as a whole are thus stiffened and given a three-dimensional appearance. The extension 25 is then bent downwardly along the hinge line 27 in order to bring it into an approximately vertical plane behind the remainder of the display element. The strip 29 remains in this plane but the remainder of the extension is bent forwardly along the inner line 28 to bring the strip 30 into an approximately horizontal plane, and is then bent upwardly along the outer line 28 to bring the strip 31 into an approximately vertical plane. If the end of the display element 10 having the extension 25 is thought of as the upper end of the display, the display element 10 and support element or pole 11 are joined by passing the pole through each of the holes 26, the pole passing first through the lowermost hole 26 and continuing through each of the other holes in order. Finally, the pole passes through the hole 36 and an arcuate portion of the upper end of the pole is slipped into the slot 34 so that the tongue 35 enters the upper end of the hollow pole to lock the pole and display element together. Then, in order to further stiffen the display element and add to the three-dimensional appearance, the marginal regions 22 are bent rearwardly along their respective score lines 23. The final appearance of the display is as shown in FIGS. 1–3.

Another embodiment of the invention, shown in FIGS. 5–8, comprises generally a display element 40 and a support element 41, here again a pole being chosen to illustrate a support element. The display element is an initially flat cardboard sheet or the equivalent (see FIG. 8) which is divided, for example, into three panels 44, 45, and 46, by two transverse hinge lines 43. Each panel comprises a central display region 49 and two marginal regions 50 on opposite sides of it, the marginal regions being separated from the central region 49 by two arcuate score lines 51 which are the mirror image of each other, the score lines meeting along the transverse center line of the panel. The display element 40 is similar to the display element 10 of FIGS. 1–4, the major difference between the two being that in the example of FIGS. 5–8 the score lines 51 of each panel are concave with respect to the central region 49, whereas in the example of FIGS. 1–4 the score lines 21 are convex with respect to the central region 19. Each of the marginal regions 50, except the outermost one of the panel 46, is provided with a hole 56 for accommodating the pole 41, and means, for example in the form of an extension 55, are provided for securing the display element 40 to the upper end of the pole 41.

Figure 6:
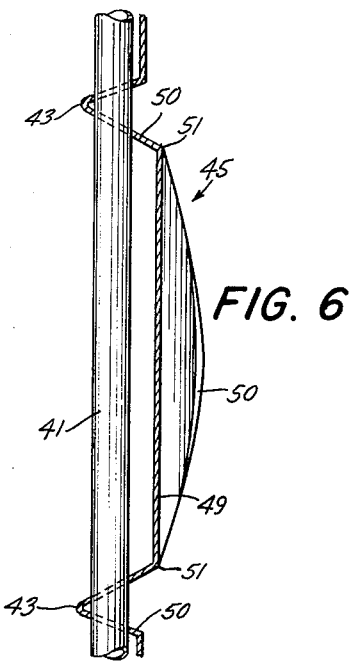
FIG. 6 is a vertical cross-sectional view on line 6—6 of FIG. 5.
Figure 7:
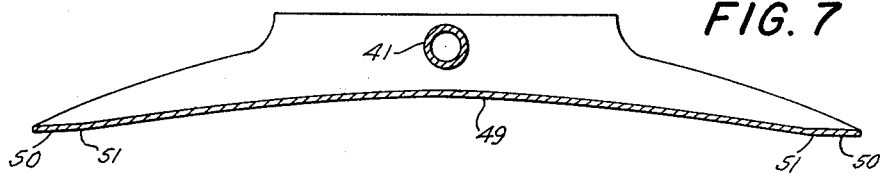
FIG. 7 is a horizontal cross-sectional view on line 7—7 of FIG. 5.
Figure 8:
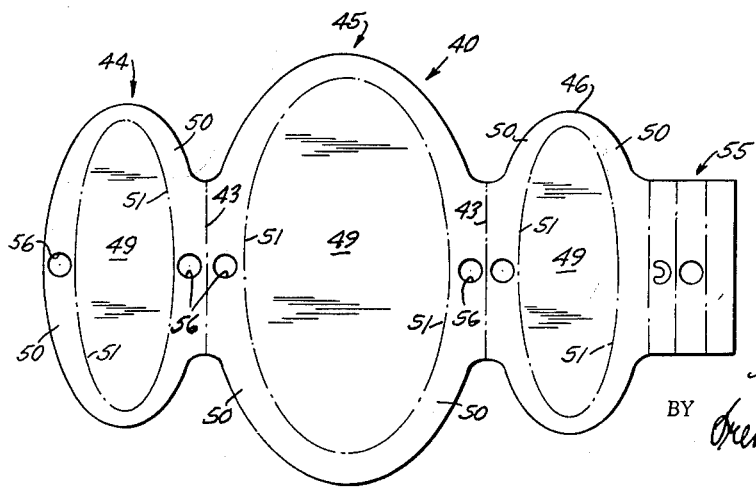
FIG. 8 is a face view of the sheet stock being folded to form the display of FIG. 1.

To set up the display, the marginal regions 50 are bent rearwardly along their respective score lines 51 and forwardly along the hinge lines 43 (see FIG. 6). Due to the curvature of the score lines 51, the bending back of the marginal regions 50 causes the central display regions 49 to assume a forwardly concave contour as viewed in FIG. 7. The display regions and the display element as a whole are thus stiffened and given a three-dimensional appearance. The extension 55 is then bent in the same way that the extension 25 of FIG. 4 is bent preparatory to its locking engagement with the upper end of the pole 41. The pole is then passed through the holes 56 in the same way as was described before with reference to passage of the pole 11 through the holes 26. The final appearance of the display is as shown in FIGS. 5–7.

It will be seen, therefore, that the present invention provides a display device comprising just two elements, namely, a support such as a pole, and a single sheet of cardboard or the like scored and folded in a special and unique manner, which when set up produce a stiff and attractive display.

The invention has been shown and described in preferred form only and by way of example and many variations may be made in the illustrative embodiments which will still be comprised within the scope and spirit of the invention. For example, although the support element has been depicted as a pole, any element capable of maintaining the marginal regions of each panel in their rearwardly disposed condition could be used. It is understood, therefore, that the invention is not limited to any specific form or embodiment except insofar as such limitations are set forth in the appended claims.

What is claimed is:

1. A display device comprising a display element and a support element, said display element being an initially flat cardboard sheet having a central display region bounded by a first pair of arcuate score lines adjacent its upper and lower edges respectively and a second pair of arcuate score lines adjacent to its side edges respectively, each pair of score lines being curved in mirror-image relation, the marginal regions beyond said score lines being all bent along said lines in the same direction through an angle less than 90°, said support element engaging only one pair of said marginal regions but being effective thereby to retain the other pair in bent condition whereby the central region is retained in a display condition stiffened along all edges.

2. A display device according to claim 1 wherein said support element is a straight pole or rod, and each of said one pair of marginal regions is provided with a hole for accommodating said pole, said holes being aligned and said pole extending through both of said holes.

3. A display device according to claim 1 wherein said score lines are concave with respect to said central region.

4. A display device according to claim 1 wherein said score lines are convex with respect to said central region.

5. A display device comprising a display element and a support element, said display element being an initially flat cardboard sheet having a plurality of aligned integral panels, each panel having a central display region and marginal regions on opposite sides of said central region, an arcuate score line separating said central region of each panel from each of said marginal regions flanking it, said score lines in each panel being the mirror image of each other, said marginal regions of each panel being bent in the same direction along their respective score lines in order to distort said central region between them so that said central region assumes a non-planer condition and is thereby stiffened, the free edge of each of said marginal regions of each panel being joined to the free edge of a marginal region of the next adjacent panel by a hinge line, each of said marginal regions being provided with a hole, all of said holes being in alignment, and said support element being a straight pole or rod extending through all of said holes in order to support said display element and to maintain said marginal regions in their bent condition.

6. A display device comprising a display element and a support element, said display element being an initially flat cardboard sheet having an oval score line defining a central display region and a continuous marginal portion completely surrounding said central region, said marginal portion being bent toward one face of said sheet along said score line in order to distort said central region so that the front face of the latter is curved out of its original plane and is thereby stiffened, and said support element engaging said marginal region on opposite sides of said central region and maintaining said marginal region in bent condition.

7. A display device comprising a plurality of display elements as defined in claim 6 integrally formed in side-by-side relation, the adjacent edges of each pair of adjacent display elements being joined along a straight hinge line, and said support element simultaneously engaging the marginal region of each display element on opposite sides of its respective central region.

References Cited by the Examiner
UNITED STATES PATENTS 2,050,894  8/36   Paige _____ 229—8 X
2,509,397  5/50   Paige.
2,882,629  4/59   Moebius.
3,059,362  10/62  Scherotto _____ 40—124.1

JEROME SCHNALL, *Primary Examiner.*

E. V. BENHAM, LAWRENCE CHARLES, *Examiners.*